United States Patent [19]
Kishida et al.

[11] 4,339,474
[45] Jul. 13, 1982

[54] COATING COMPOSITION AND PROCESS FOR PREPARING SYNTHETIC RESIN SHAPED ARTICLES BY USING SAME

[75] Inventors: Kazuo Kishida; Isao Sasaki; Kenji Kushi; Misao Tamura, all of Otake, Japan

[73] Assignee: Mitsubishi Rayon Company, Ltd., Tokyo, Japan

[21] Appl. No.: 239,202

[22] Filed: Mar. 3, 1981

[30] Foreign Application Priority Data

Mar. 4, 1980 [JP] Japan ................................. 55-27088
Mar. 12, 1980 [JP] Japan ................................. 55-31017

[51] Int. Cl.³ .......................... B05D 3/06; C08F 8/00
[52] U.S. Cl. .............................. 427/54.1; 204/159.16; 427/44
[58] Field of Search ......................... 427/54.1, 44; 204/159.16, 159.22, 159.23, 159.24

[56] References Cited

U.S. PATENT DOCUMENTS 3,968,309  7/1976  Matsuo et al. ...................... 428/409
4,049,634  9/1977  Ko et al. ...................... 204/159.16 X
4,199,421  4/1980  Kamada et al. ................. 204/159.22
4,228,267  10/1980  Higashizume et al. ......... 428/412 X

*Primary Examiner*—John D. Smith
*Assistant Examiner*—Thurman K. Page
*Attorney, Agent, or Firm*—Oblon, Fisher, Spivak, McClelland & Maier

[57] ABSTRACT

A coating composition for the preparation of synthetic resin shaped articles excellent in abrasion resistance and weatherability is described. This composition comprises (a) a polyfunctional monomer composition comprising (i) 40–100 wt. % of a polyfunctional monomer containing at least three methacryloyloxy or acryloyloxy groups in the molecule and having a MW of not higher than about 900 and (ii) 0–60 wt. % of a mono- or bifunctional monomer having one or two methacryloyloxy or acryloyloxy groups in the molecule and having a MW of not higher than about 300 per methacryloyloxy or acryloyloxy group, (b) 5–35 parts by wt., based on 100 wt. parts of the monomer composition, of at least one ultraviolet absorber, (c) 0.5–8 wt. parts, based on 100 parts by wt. of the monomer composition, of at least one polymeric material selected from polymers of alkyl methacrylates and alkyl acrylates, and (d) 0.01–6 parts by wt., based on 100 parts by wt. of the monomer composition, of a photosensitizer. The coating composition is coated on a synthetic resin shaped article and then, irradiated with ultraviolet rays in an inert gas or air to form a crosslinked coating film having a thickness of 1 to 30 microns.

19 Claims, No Drawings

COATING COMPOSITION AND PROCESS FOR PREPARING SYNTHETIC RESIN SHAPED ARTICLES BY USING SAME

BACKGROUND OF THE INVENTION

1. Field of the Invention

This invention relates to a coating composition which provides under irradiation with ultraviolet rays a crosslinked and cured coating film excellent in the abrasion resistance, flexibility, heat resistance, solvent resistance, adhesion to the substrate and weatherability, and also to a process for preparing synthetic resin shaped articles excellent in the abrasion resistance and weatherability by using this coating composition.

2. Description of the Prior Art

Synthetic resin shaped articles prepared from polymethyl methacrylate resins, polycarbonate resins, polystyrene resins and AS resins have a light weight and are excellent in their impact resistance, and these synthetic resins are cheap and can easily be molded. Because of these various advantages, these synthetic resin shaped articles have been used in various fields and new uses of these synthetic resin shaped articles have been developed in various fields. However, these synthetic resin shaped articles are poor in the abrasion resistance, and therefore, the surfaces are readily damaged by contact with a hard article or abrasion or scratching. Damage caused on the surfaces of these shaped articles lower the commercial value thereof drastically and shorten the service lives of these shaped articles. Therefore, it has eagerly been desired to improve the abrasion resistance of the surface in these synthetic resin shaped articles. Shaped articles having an improved abrasion resistance, which are prepared by coating the above-mentioned synthetic resin shaped article with a coating material, are often used outdoors. For example, they are used as windshields of air planes, outdoor signboards, traffic control signs and automobile parts, and therefore, a high weatherability is also eagerly desired in these shaped articles.

Various methods have heretofore been proposed as means for eliminating these defects of the above-mentioned synthetic resin shaped articles. For example, there can be mentioned a method in which a coating material comprised of a resin composition comprising a silicone or melamine type resin is coated on the surface of a synthetic resin shaped article and then, the coating material is heated to be thereby condensed to yield a crosslinked coating film having an improved abrasion resistance on the synthetic resin shaped article, and a method in which a polyfunctional monomer containing at least one polymerizable group in the molecule is coated on the surface of a synthetic resin shaped article and then, the coated shaped article is irradiated with active energy rays to form a crosslinked and cured coating film on the surface of the synthetic resin shaped article, whereby a synthetic resin shaped article having an excellent abrasion resistance is obtained (see U.S. Pat. Nos. 3,518,341 and 4,041,120 and Japanese Laid-Open Patent Application No. 102,936/78, No. 104,638/78 and No. 97,633/79).

Indeed, the abrasion resistance of the surface of synthetic resin shaped articles can be improved by these methods. However, these methods are not completely satisfactory in some points. For example, the products obtained according to the former method are poor in durability to thermal shock and hot water, and in chemical resistance. Furthermore, the products obtained according to the latter method are poor in weatherability though they are satisfactory in durability and chemical resistance.

Moreover, in the case where a synthetic resin shaped article on which an abrasion-resistant surface coating film is to be formed has a poor weatherability, for example, when the shaped article is comprised of a polycarbonate resin or the like, even if the weatherability of the abrasion-resistance surface coating film per se is excellent, the shaped article is deteriorated by active energy rays, such as ultraviolet rays, permeating through the surface coating film, with the result that strong yellowing is caused in the shaped article, cracks are formed on the cured surface coating film and in extreme cases, the surface coating film is undesirably separated from the shaped article.

Under such background, we did research with a view to developing a synthetic resin shaped article excellent in not only abrasion resistance but also weatherability, and we have now found that when a coating composition comprising at specific ratios a monomer mixture comprising a specific polyfunctional methacrylate or acrylate and a monofunctional or bifunctional methacrylate or acrylate in a specific proportion, optionally with a monomer having a specific structure, a homopolymer or copolymer of an alkyl methacrylate or acrylate, an ultraviolet absorber, and a photosensitizer is coated on a synthetic resin shaped article and is then cured, a synthetic resin shaped article having excellent abrasion resistance and weatherability can be advantageously obtained on an industrial scale.

SUMMARY OF THE INVENTION

In accordance with one fundamental aspect of the present invention, there is provided a coating composition comprising:

(a) a polyfunctional monomer composition comprising (i) at least 40% to 100% by weight of a polyfunctional monomer containing at least three methacryloyloxy or acryloyloxy groups in the molecule and having a molecular weight of not higher than approximately 900 and (ii) 0% to 60% by weight of a monofunctional or bifunctional monomer having one or two methacryloyloxy or acryloyloxy groups in the molecule and having a molecular weight of not higher than approximately 300 per methacryloyloxy or acryloyloxy group, especially a monomer mixture comprising (i) at least 40% by weight of at least one polypentaerythritol polyacrylate containing at least three acryloyloxy groups in the molecule and having a molecular weight of not higher than approximately 900, said polypentaerythritol polyacrylate being represented by the following general formula (I):

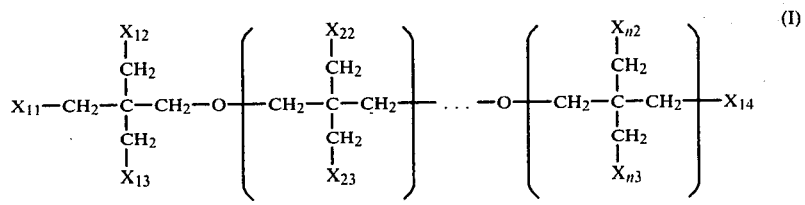

wherein at least three of $X_{11}$, $X_{12}$, $X_{13}$, $X_{22}$, $X_{23}$ ... $X_{n2}$, $X_{n3}$ and $X_{14}$ are acryloyloxy groups ($CH_2=CH-COO-$) and the remaining groups are hydroxyl groups (—OH), and n is an integer of from 2 to 5, (ii) up to 50% by weight of a bifunctional monomer represented by the following general formula (II):

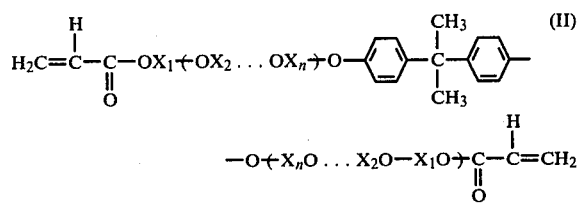

wherein $X_1$, $X_2$ ... $X_n$ may be the same or different and each stands for an alkylene group having up to 6 carbon atoms which group may have one hydroxyl substituent, and n is an integer of from 0 to 5, said bifunctional monomer having a molecular weight of not higher than approximately 300 per acryloyloxy group, and (iii) 0% to 60% by weight of a monofunctional monomer containing one acryloyloxy group in the molecule and having a boiling point of at least 150° C. at normal pressure, a viscosity of not higher than 20 cps as measured at 20° C. and a molecular weight of not higher than approximately 300, (b) 5 to 35 parts by weight, based on 100 parts by weight of the polyfunctional monomer composition (a) mentioned above, of at least one ultraviolet absorber, (c) 0.5 to 8 parts by weight, based on 100 parts by weight of the polyfunctional monomer composition (a) mentioned above, of at least one polymeric material selected from polymers of alkyl methacrylates and alkyl acrylates, and (d) 0.01 to 6 parts by weight, based on 100 parts by weight of the polyfunctional monomer composition (a) mentioned above, of a photosensitizer, preferably with (e) 0.0001 to 2.0 parts by weight, based on 100 parts by weight of the polyfunctional monomer composition (a) mentioned above, of at least one silicone type surface active agent modified with a polyoxyalkylene group.

In accordance with another fundamental aspect of the present invention, there is provided a process for the preparation of synthetic resin shaped articles excellent in abrasion resistance and weatherability, which comprises coating the surface of a synthetic resin shaped article with the above-mentioned coating composition and irradiating the coated shaped article with ultraviolet rays in an inert gas or air to form a crosslinked and cured coating film having a thickness of 1 to 30 microns.

DESCRIPTION OF THE PREFERRED EMBODIMENTS

The polyfunctional monomer containing at least three methacryloyloxy or acryloyloxy groups in the molecule and having a molecular weight of not higher than approximately 900 (hereinafter referred to as "polyfunctional monomer" for brevity), that is used in the present invention, exhibits a good polymerizing activity under irradiation with ultraviolet rays and is cured to form a crosslinked polymer having a high degree of crosslinking which ensures high surface hardness and abrasion resistance.

The polyfunctional monomer has a molecular weight of not higher than approximately 900. That is, the molecular weight per methacryloyloxy or acryloyloxy group is not higher than approximately 300, preferably not higher than approximately 250. Namely, it is preferred that the molecular weight of the polyfunctional monomer be not higher than approximately 750. If the molecular weight of the polyfunctional monomer exceeds approximately 900, the intended crosslinked coating film excellent in the surface hardness and abrasion resistance cannot be obtained.

The above-mentioned polyfunctional monomer may be used alone. It is preferable, however, that the polyfunctional monomer is used as a monomer mixture comprised of the polyfunctional monomer and a bifunctional monomer and/or a monofunctional monomer. The proportion of the polyfunctional monomer in the monomer mixture is preferably at least 40% by weight and more preferably in the range of from 60 to 90% by weight, based on the weight of the monomer mixture. If the amount of the polyfunctional monomer is smaller than 40% by weight, a crosslinked coating film having sufficient surface hardness and abrasion resistance cannot be obtained.

As the above-mentioned polyfunctional monomer, there can be mentioned, for example, trimethylolpropane trimethacrylate, trimethylolpropane triacrylate, pentaglycerol trimethacrylate, pentaglycerol triacrylate, pentaerythritol trimethacrylate, pentaerythritol triacrylate, pentaerythritol tetramethacrylate, pentaerythritol tetraacrylate, dipentaerythritol trimethacrylate, dipentaerythritol triacrylate, dipentaerythritol tetramethacrylate, dipentaerythritol tetraacrylate, dipentaerythritol hexamethacrylate, dipentaerythritol hexaacrylate, monomers prepared by esterification of, for example, (i) one mole of trimellitic acid with three moles of 2-hydroxyethyl methacrylate or 2-hydroxyethyl acrylate, (ii) one mole of pyromellitic acid with four moles of 2-hydroxyethyl methacrylate or 2-hydroxyethyl acrylate, (iii) two moles of trimethylolethane with one mole of succinic acid and 4 moles of methacrylic acid or acrylic acid, (iv) two moles of trimethylolethane with one mole of adipic acid and four moles of methacrylic acid or acrylic acid, (v) two moles of trimethylolpropane with one mole of succinic acid and four moles of methacrylic acid or acrylic acid, tris-(2-hydroxyethyl)isocyanurate trimethacrylate, tris-(2-hydroxyethyl)isocyanurate triacrylate, 2,2,4-trimethyl-1,3-pentane-diol methacrylate and 2,2,4-trimethyl- 1,3-pentane-diol acrylate. These monomers may be used alone or as a mixture of two or more of them.

Among these polyfunctional monomers, polypentaerythritol polyacrylates represented by the above general formula (I), which contain at least three acryloyloxy groups in the molecule, are especially preferred from the industrial viewpoint and in view of properties thereof, because these monomers exhibit a very good polymerizing activity under irradiation with ultraviolet rays even in an ordinary air atmosphere and are readily cured to form crosslinked polymers having a high degree of crosslinking ensuring a high abrasion resistance. Among these polypentaerythritol polyacrylate monomers, dipentaerythritol triacrylate, dipentaerythritol tetraacrylate, dipentaerythritol pentaacrylate and dipentaerythritol hexaacrylate are especially preferred because they are particularly excellent in the polymerizing activity under irradition with ultraviolet rays in air.

The monofunctional or bifunctional monomer which may be used in combination with the polyfunctional monomer in the present invention is a monomer which contains one or two methacryloyloxy or acryloyloxy groups in the molecule and has a molecular weight of not higher than approximately 300 per methacryloyloxy or acryloyloxy group. More specifically, in the case where the monomer contains two methacryloyloxy or acryloyloxy groups in the molecule, the molecular weight is not higher than approximately 600, preferably not higher than approximately 500, and in the case where the monomer contains one methacryloyloxy or acryloyloxy group in the molecule, the molecular weight is not higher than approximately 300, preferably not higher than approximately 250. The monofunctional or bifunctional monomer exhibits a good curing property under irradiation with ultraviolet rays, and this monomer is incorporated in the monomer mixture to impact excellent smoothness, flexibility and adhesion to the crosslinked coating film without reduction of the abrasion resistance of the coating film.

When a monofunctional or bifunctional monomer having a molecular weight exceeding approximately 300 per methacryloyloxy or acryloyloxy group is used, the intended synthetic resin shaped article excellent in both surface hardness and abrasion resistance cannot be obtained.

As the monofunctional or bifunctional monomer, there can be mentioned, for example, ethylene glycol dimethacrylate, ethylene glycol diacrylate, 1,3-propylene glycol dimethacrylate, 1,3-propylene glycol diacrylate, 1,4-butane-diol dimethacrylate, 1,4-butane-diol diacrylate, 1,6-hexane-diol dimethaacrylate, 1,6-hexane-diol diacrylate, diethylene glycol dimethacrylate, diethylene glycol diacrylate, neopentyl glycol dimethacrylate, neopentyl glycol diacrylate, tetraethylene glycol dimethacrylate, tetraethylene glycol diacrylate, 2-butene-1,4-dimethacrylate, 2-butene-1,4-diacrylate, cyclohexane-1,4-dimethanol dimethacrylate, cyclohexane-1,4-dimethanol diacrylate, hydrogenated bisphenol-A dimethacrylate, hydrogenated bisphenol-A diacrylate, 1,5-pentane dimethacrylate, 1,5-pentane diacrylate, trimethylolethane dimethacrylate, trimethylolethane diacrylate, trimethylolpropane dimethacrylate, trimethylolpropane diacrylate, dipropylene glycol dimethacrylate, dipropylene glycol diacrylate, 1,3-butylene glycol dimethacrylate, 1,3-butylene glycol diacrylate, 2,2-bis-(4-methacryloxyphenyl)propane, 2,2-bis-(4-acryloxyphenyl)propane, 2,2-bis-(4-methacryloxyethoxyphenyl)propane, 2,2-bis-(4-acryloxyethoxyphenyl)propane, 2,2-bis-(4-methacryloxydiethoxyphenyl)propane, 2,2-bis-(4-methacryloxypropoxyphenyl)propane, 2,2-bis-(4-acryloxypropoxyphenyl)propane, 2,2-bis-[4-methacryloxy(2-hydroxypropoxy)phenyl]propane, 2,2-bis-[4-acryloxy(2-hydroxypropoxy)phenyl]propane, 2,2-bis-[4-acryloxy(2-hydroxypropoxyethoxy)phenyl]-propane, 2,2-bis[4-methacryloxy(2-hydroxypropoxyethoxy)phenyl]propan, bis-(2-methacryloyloxyethyl) phthalate, a reaction product of one mole of hexamethylene diisocyanate with two moles of 2-hydroxyethyl methacrylate or 2-hydroxyethyl acrylate, a reaction product of one mole of tolylene diisocyanate with two moles of 2-hydroxyethyl methacrylate or 2-hydroxyethyl acrylate, methyl methacrylate, methyl acrylate, ethyl methacrylate, ethyl acrylate, propyl methacrylate, propyl acrylate, butyl methacrylate, butyl acrylate, isobutyl methacrylate, isobutyl acrylate, t-butyl methacrylate, t-butyl acrylate, 2-ethylhexyl methacrylate, 2-ethylhexyl acrylate, lauryl methacrylate, lauryl acrylate, cyclohexyl methacrylate, cyclohexyl acrylate, methoxyethyl methacrylate, methoxyethyl acrylate, ethoxyethyl methacrylate, ethoxyethyl acrylate, butoxyethyl methacrylate, butoxyethyl acrylate, 2-hydroxyethyl methacrylate, 2-hydroxyethyl acrylate, 2-hydroxypropyl methacrylate, 2-hydroxypropyl acrylate, 2-hydroxy-3-chloropropyl methacrylate, 2-hydroxy-3-chloropropyl acrylate, glycidyl methacrylate, glycidyl acrylate, 2-chloroethyl methacrylate, 2-chloroethyl acrylate, ethylcarbitol methacrylate, ethylcarbitol acrylate, tetrahydrofurfuryl methacrylate, tetrahydrofurfuryl acrylate, benzyl methacrylate, benzyl acrylate, 1,4-butylene glycol monomethacrylate and 1,4-butylene glycol monoacrylate. These monomers may be used alone or as a mixture of two or more of them.

The proportion of the monofunctional or bifunctional monomer in the polyfunctional monomer composition is up to 60% by weight, preferably up to 50% by weight. If the amount of this monomer is larger than 60% by weight based on the monomer mixture, the intended crosslinked coating film having sufficient surface hardness and abrasion resistance cannot be obtained. When good smoothness, flexibility and adhesion are especially required for the crosslinked coating film excellent in the weatherability, not the bifunctional monomer but the monofunctional monomer should be used preferably in an amount of 10 to 50% by weight based on the weight of the polyfunctional monomer composition. When the monofunctional monomer is used in an amount of at least 10% by weight based on the weight of the monomer mixture, by the synergistic action with an alkyl methacrylate or acrylate polymer described hereinafter, a larger quantity of an ultraviolet absorber can be incorporated stably in the coating composition without any bad influences on the crosslinked coating film.

Among the foregoing monofunctional and bifunctional monomers, bifunctional monomers represented by the general formula (II), which are preferably used in combination with the monomer represented by the general formula (I), exhibit a good curing property under irradiation with ultraviolet rays in air, and therefore, these bifunctional monomers can advantageously be incorporated when an excellent flexibility is required for the crosslinked coating film without reduction of the abrasion resistance of the film.

However, use of compounds of the general formula (II) in which $X_n$ has 7 or more carbon atoms or n is an integer of 6 or more is not preferred, because the abrasion resistance of the crosslinked coating film is reduced or the adhesion to the substrate is reduced. Monomers of the general formula (II) in which X has up to 3 carbon atoms and n is an integer of up to 3 are especially preferred.

As the bifunctional monomer represented by the general formula (II), there can be mentioned, for example, 2,2-bis-(4-acryloyxphenyl)propane, 2,2-bis(4-acryloxyethoxyphenyl)propane, 2,2-bis(4-acryloxydiethoxyphenyl)propane, 2,2-bis(4-acryloxypropoxyphenyl)propane, 2,2-bis[4-acryloxy(2-hydroxypropoxy)phenyl]propane and 2,2-bis[4-acryloxy-(2-hydroxypropoxyethoxy)phenyl]propane.

The proportion of the bifunctional monomer represented by the general formula (II) in the polyfunctional monomer composition is up to 50% by weight, preferably up to 30% by weight. If the amount of the bifunctional monomer represented by the general formula (II) is larger than 50% by weight based on the polyfunctional monomer composition. The abrasion resistance of the crosslinked coating film is reduced.

The monofunctional monomer containing one acryloyloxy group in the molecule and having a boiling point of at least 150° C. at normal pressure and a viscosity of not higher than 20 cps as measured at 20° C. (hereinafter referred to as "monofunctional monomer" for brevity), is used in combination with the monomer represented by the general formula (I), when a smooth coated surface is formed upon application of the coating composition on a substrate shaped article and excellent flexibility and adhesion to the substrate shaped article are required for the crosslinked coating film. More specifically, in order to obtain a coating having a good smoothness upon application of the coating composition of the present invention on to a shaped article, it is preferred that the viscosity of the monomer mixture be up to 1,000 cps, and in order to impart to the cured coating film a good surface smoothness and excellent flexibility and adhesion to the substrate shaped article, a monofunctional monomer satisfying the above requirements should be used.

As the monofunctional monomers, those which have a hydroxyl group and/or a cyclic ether linkage and/or a linear ether linkage, such as 2-hydroxyethyl acrylate, 2-hydroxypropyl acrylate, glycidyl acrylate, tetrahydrofurfuryl acrylate, ethoxyethyl acrylate, ethylcarbitol acrylate, butoxyethyl acrylate and 1,4-butylene glycol monoacrylate, are especially preferably used in the present invention, because these monomer are especially excellent in the polymerizing activity in air.

The proportion of the monofunctional monomer in the polyfunctional monomer composition may be varied within the range of from 0% to 60% by weight. The monofunctional monomer may not be contained in the polyfunctional monomer composition. It is preferable, however, that the monofunctional monomer is contained in an amount of from 10% to 50% by weight. If the amount of the monofunctional monomer is smaller than 10% by weight based on the weight of the monomer mixture, it is not easy to reduce the viscosity of the coating composition to the desired extent and therefore, it sometimes happens that the surface smoothness is reduced to some extent. When the amount of the monofunctional monomer exceeds 60% by weight based on the weight of the monomer mixture, a crosslinked coating film having a sufficient abrasion resistance cannot be obtained. When the monofunctional monomer is used in an amount of 10 to 50% by weight based on the weight of the polyfunctional monomer composition, a large quantity of the ultraviolet absorber can be incorporated stably, by the synergistic action with an alkyl methacrylate or alkyl acrylate polymer described hereinafter, without any bad influences on the crosslinked coating film. If the boiling point under atmospheric pressure of the monofunctional monomer is lower than 150° C., when the coating composition is coated and cured on the surface of a shaped article, the monofunctional monomer is volatilized and removed from the coating composition, resulting in an increase of the viscosity of the coating composition. In contrast, if the viscosity of the monofunctional monomer exceeds 20 cps as measured at 20° C., it is impossible to effectively reduce the viscosity of the polyfunctional monomer composition.

In the present invention, an alkyl methacrylate or alkyl acrylate polymer is incorporated with the above-mentioned polyfunctional monomer composition. This polymer exerts an effect of improving the adhesion of the crosslinked coating film to the substrate shaped article without reduction of appearance characteristics, such as transparency and smoothness of the crosslinked coating film and acts as a dispersant for uniformly dispersing a large quantity of the ultraviolet absorber in the crosslinked coating film. The polymer is indispensable for improving the weatherability of a synthetic resin shaped article having a high abrasion resistance.

It is known to improve the weatherability of a coating film or coated product by incorporating an ultraviolet absorber into a coating composition or varnish. According to this known technique, however, it has been impossible to incorporate a large quantity of an ultraviolet absorber in a cured coating film excellent in the surface hardness and abrasion resistance, such as the film intended in the present invention. More specifically, even if a large quantity of an ultraviolet absorber is incorporated into a coating composition, when the coating composition is cured, the ultraviolet absorber incorporated in such a large quantity cannot be retained uniformly in the crosslinked coating film, but the ultraviolet absorber is irregularly distributed in the form of small islands in the crosslinked coating film or the ultraviolet absorber bleeds out on the surface of the crosslinked coating film, with the result that the entire coating film becomes opaque and milky white or the surface hardness and abrasion resistance of the cured coating film are reduced to a great extent.

In fact, an ultraviolet absorber can be included into the polyfunctional monomer composition of the present invention only in an amount of 4 parts by weight at the largest per 100 parts by weight of the polyfunctional monomer composition, unless the above-mentioned alkyl methacrylate or acrylate polymer is incorporated in combination with the ultraviolet absorber into the monomer composition. If an ultraviolet absorber is incorporated in an amount exceeding this critical level, various defects such as mentioned above are evident. If an ultraviolet absorber is incorporated in an amount smaller than 4 parts by weight per 100 parts by weight of the polyfunctional monomer composition, the above-mentioned defects do not occur, but the effect of improving the weatherability is insufficient. It should be noted that if a small amount of the above-mentioned alkyl methacrylate or acrylate polymer is incorporated in the coating composition, the foregoing defects can be eliminated completely.

The alkyl methacrylate or acrylate polymer that is used in the present invention has an intrinsic viscosity [η] which is a criterion indicating the average molecular weight of the polymer, of from 0.01 to 0.30. A homopolymer or copolymer of an alkyl methacylate or alkyl acrylate having 1 to 8 carbon atoms is preferably used as the alkyl methacrylate or acrylate polymer in the present invention.

If the intrinsic viscosity [η] of the alkyl methacrylate or acrylate polymer is lower than 0.01, the effect of dispersing the ultraviolet absorber in the crosslinked coating film by the alkyl methacrylate or acrylate polymer is not sufficient. On the other hand, if the intrinsic viscosity [η] is higher than 0.3, the solubility of the alkyl methacrylate or acrylate polymer in the coating composition becomes poor or the smoothness or abrasion resistance of the cured coating film is reduced. If the polymer has an alkyl group having 9 or more carbon atoms, the solubility of the polymer in the coating composition is degraded or the smoothness or abrasion resistance is reduced.

As the alkyl methacrylate or acrylate polymer there can be mentioned homopolymers and copolymers of methyl methacrylate, methyl acrylate, ethyl metacrylate, ehtyl acrylate, propyl methacrylate, propyl acrylate, butyl methacrylate, butyl acrylate, isobutyl methacrylate, isobutyl acrylate, amyl methacrylate, hexyl methacrylate, heptyl methacrylate, octyl methacrylate, 2-ethyl-1-hexyl methacrylate, 2-ethyl-1-hexyl acrylate, 3-pentyl acrylate, 3-methyl-1-butyl acrylate, 2-ethyl-1-butyl acrylate and 2-heptyl acrylate. These polymers may be used alone or as a mixture of two or more of them.

The alkyl methacrylate or acrylate polymer is incorporated in an amount of 0.5 to 8.0 parts by weight, preferably 1 to 5 parts by weight, based on 100 parts by weight of the polyfunctional monomer composition. If the amount of the polymer is smaller than 0.5 part by weight based on 100 parts by weight of the polyfunctional monomer composition, it is difficult to incorporate the desired amount of the ultraviolet absorber. If the amount of the polymer exceeds 8.0 parts by weight per 100 parts by weight of the polyfunctional monomer composition, the smoothness and abrasion resistance of the resulting crosslinked coating film are degraded.

The kind of the ultraviolet absorber used in the present invention is not particularly critical, and even a photostabilizer for polymers in a broad sense is included. Any of ultraviolet absorbers which are soluble uniformly in the coating composition of the present invention and excellent in the weatherability can be used in the present invention. From viewpoints of good solubility in the coating composition and high improvement of the weatherability, it is preferred to use compounds derived from benzophenone, benzotriazole, phenyl salicylate or phenyl benzoate and having a maximum absorption wave length in the range of from 240 to 380 nm. A benzophenone type ultraviolet absorber is especially preferred because this ultraviolet absorber can be incorporated in an especially large amount in the coating composition of the present invention.

As the ultraviolet absorber, there can be mentioned, for example, 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy-4methoxybenzophenone, 2,2'-dihydroxy-4,4'-dimethoxybenzophenone, phenyl salicylate, p-tert-butylphenyl salicylate, p-(1,1,3,3-tetramethylbutyl)-phenyl salicylate, 3-hydroxyphenyl benzoate, phenylene-1,3-dibenzoate, 2-(2-hydroxy-5-methylphenyl)benzotriazole, 2-(2-hydroxy-5-tert-butylphenyl)-5-chlorobenzotriazole, 2-(2-hydroxy-3,5-di-tert-butylphenyl)benzotriazole, 2-(2-hydroxy-5-tert-butylphenyl)benzotriazole and 2-(2-hydroxy-4-octyloxyphenyl)benzotriazole. Among these ultraviolet absorbers, those which are represented by the following general formula (III):

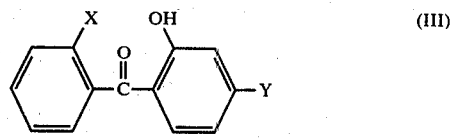

wherein X stands for —H or —OH and Y stands for —OH or —OR in which R stands for an alkylene group having 1 to 20 carbon atoms, are preferred from a viewpoint of the solubility in the coating composition of the present invention. It is especially preferred that these ultraviolet absorbers be used in combination with the monomers represented by the general formula (I), which are excellent in the curing property under irradiation with ultraviolet rays in air. It is most preferred that an ultraviolet absorber represented by the general formula (III) which contains one —OH group and an ultraviolet absorber represented by the genral formula (III) which contains two —OH groups be used in combination and at least one of the two benzophenone type ultraviolet absorbers represented by the general formula (III) has an —OR substituent, because a highest uniform solubility of the ultraviolet absorber is attained and highest effect of improving the weatherability can be obtained and because a synthetic resin shaped article having an excellent weatherability can be manufactured most easily on an industrial scale. For example, especially good results are obtained when 2-hydroxy-4-octyloxybenzophenone and 2,4-dihydroxybenzophenone are used in combination.

When these ultraviolet absorbers are used in combination with a homopolymer or copolymer of ethyl methacrylate or ethyl acrylate as the alkyl methacrylate or acrylate polymer ingredient (c) mentioned above, the intended effects of the present invention can be completely obtained.

These ultraviolet absorbers may be used alone or as a mixture of two or more of them.

The ultraviolet absorber is incorporated in the coating composition of the present invention in an amount of 5 to 35 parts by weight, preferably 8 to 30 parts by weight, based on 100 parts by weight of the polyfunctional monomer composition. If the amount of the ultraviolet absorber is smaller than 5 parts by weight per 100 parts by weight of the polyfunctional monomer composition, the effect of improving the weatherability of a synthetic resin shaped article is insufficient. If the amount of the ultraviolet absorber is incorporated in an amount larger than 35 parts by weight based on 100 parts by weight of the polyfunctional monomer composition, the abrasion resistance and smoothness of the crosslinked coating film are drastically reduced.

The silicone type surface active agent which may be used in the present invention is effective for improving the smoothness of the crosslinked coating film, and if there is a risk of occurrence of whitening due to contact with an organic solvent, this component is necessary for preventing occurrence of this undesirable phenomenon.

This surface active agent may be incorporated in the composition of the present invention in an amount of 0.0001 to 2.0 parts by weight based on 100 parts by weight of the polyfunctional monomer composition. If the amount of the surface active agent is smaller than 0.0001 part by weight, no substantial effects can be attained by incorporation of the surface active agent, and if the amount of the surface active agent is larger than 2.0 parts by weight, the smoothness of the coating film is reduced.

The kind of the silicone type surface active agent is not particularly critical in the present invention. However, it is recommendable to use a silicone type surface active agent having a molecular structure comprised of polydimethylsiloxane units, parts of which are modified with a polyoxyalkylene group, as disclosed in Japanese Patent Application No. 4,569/79. It is preferred that the degree of modification be such that 0.1 to 10.0 units of at least one oxyalkylene group selected from $—OCH_2CH_2—$, $OCH_2CH(CH_3)—$ and the like are bonded to one methylsiloxane unit $CH_3(SiO)_{\frac{1}{2}}—$. If the degree of modification with an oxyalkylene group is lower than 0.1, the smoothness of the coating film is rather worse than in the case where the silicone type surface active agent is not added, and if the degree of modification with an oxyalkylene group is more than 10, the smoothness of the coating film is degraded.

As the photosensitizer used in the present invention, there can be mentioned, for example, carbonyl compounds such as benzoin, benzoin methyl ether, benzoin ethyl ether, benzoin isopropyl ether, acetoin, butyroin, toluoin, benzil, benzophenone, p-methoxybenzophenone, diethoxyacetophenone, $\alpha,\alpha$-dimethoxy-$\alpha$-phenylacetophenone, methylphenyl glyoxylate, ethylphenyl glyoxylate, 4,4'-bis(dimethylaminobenzophenone) and 2-hydroxy-2-methyl-1-phenylpropan-1-one; sulfur compounds such as tetramethylthiuram monosulfide and tetramethylthiuram disulfide; azo compounds such as azobisisobutyonitrile and azobis-2,4-dimethylvaleronitrile; and peroxide compounds such as benzoyl peroxide and di-tert.-butyl peroxide. The photosensitizer is preferably incorporated in an amount of 0.01 to 6 parts by weight based on 100 parts by weight of the monomer mixture. If the amount of the photosensitizer is too large, coloration of the crosslinked coating film is caused and the weatherability is reduced. If the amount of the photosensitizer is too small, the curability under irradiation of ultraviolet rays is reduced.

If necessary, at least one or other vinyl monomers exhibiting a polymerizing activity under irradiation with ultraviolet rays may be incorporated in order to impart antistatic and anti-fogging properties to the crosslinked coating film. Furthermore, appropriate amounts of an antioxidant, a storage stabilizer and other stabilizers may be added according to need.

Various coating methods such as brush coating, flow coating, spray coating, rotary coating and dip coating methods can be adopted for coating the coating composition of the present invention on a synthetic resin shaped article. From the viewpoints of the adaptability of the coating composition to the coating operation, the smoothness and uniformity of the coating and the adhesion of the crosslinked coating film to the substrate shaped article, it is most recommendable to adopt the dip coating method using an appropriate organic solvent.

As the organic solvent to be utilized in the dip coating method, there is preferably used an organic solvent which is capable of forming a homogeneous solution when mixed with the coating composition and has a boiling point of 50° to 200° C. under atmospheric pressure and a viscosity of lower than 10 cps at normal temperature, such as disclosed in Japanese Laid-Open Patent Application No. 102,936/78.

The organic solvent is used in an amount of 90 to 20 parts by weight per 10 to 80 parts by weight of the coating composition (that is, the total amount is 100 parts by weight). When the amount of the organic solvent used is smaller than 20 parts by weight, a coating excellent in the smoothness and uniformity cannot be obtained, and if the amount of the organic solvent exceeds 90 parts by weight, the resulting film becomes too thin and the surface hardness is degraded.

As the organic solvent used in the present invention, there can be mentioned, for example, alcohols such as ethanol, isopropanol, n-propanol, isobutyl alcohol and n-butyl alcohol; aromatic hydrocarbons such as benzene, toluene, xylene and ethylbenzene; ketones such as acetone and methyl ethyl ketone; ethers such as dioxane; and esters such as ethyl acetate, n-butyl acetate and ethyl propionate. These organic solvents may be used alone. Alternatively, a mixture of two or more of them may be used so far as it satisfies the above-mentioned requirements of the boiling point, viscosity and mixing ratio.

The coating composition should be coated on the surface of a synthetic resin shaped article in such an amount that the thickness of the resulting crosslinked coating film is 1 to 30 microns, preferably 2.5 to 20 microns. If the thickness of the crosslinked coating film is smaller than 1 micron, the weatherability-improving effect is low, and if the thickness of the coating film is larger than 30 microns, the adhesion to the substrate shaped article is reduced, cracking or hazing is readily caused, or no good curing of the coating composition is attained under irradiation with ultraviolet rays.

Active energy rays, for example, radioactive rays such as electron beams, $\alpha$-rays, $\beta$-rays and $\gamma$-rays emitted from an electron accelerator of 20 to 2,000 KV, may be used as means for curing the coating composition of the present invention. However, in order to obtain a crosslinked and cured coating film having such a good hardness as intended in the present invention, it is preferred that the coating composition be irradiated with ultraviolet rays having a wave length of 1,500 to 8,000 Å.

The irradiation of the coating composition with ultraviolet rays can be effected either in an inert gas atmosphere or air. However, the coating composition containing the polypentaerythritol polyacrylate represented by the general formula (I) can be advantageously irradiated with ultraviolet rays in an ordinary air atmosphere without using an expensive inert gas.

As the synthetic resin shaped article on which a crosslinked coating film is formed from the coating composition of the present invention for producing a synthetic resin shaped article excellent in both the abrasion resistance and weatherability, there can be used shaped articles of various synthetic resins which may be either thermoplastic or thermosetting. For example, there can be mentioned sheet-like shaped articles, film-like shaped articles, rod-like molded articles and various injection molded articles, which are prepared from polymethyl methacrylate resins, polycarbonate resin, polyallyldiglycol carbonate resins, polystyrene resins, acrylonitrile-styrene copolymer resins (AS resins), polyvinyl chloride resins, acetate resins, ABS resins and polyester resins. Among these shaped articles, those prepared from polymethyl methacrylate resins and polycarbonate resins are advantageously used because of their excellent characteristics such as good optical properties, high heat resistance and high impact resistance, and because, improvements in the abrasion resistance and weatherability of these resin shaped articles (especially in the weatherability of polycarbonate resins) are especially eagerly desired.

Synthetic resin shaped articles having excellent abrasion resistance and weatherability, which are prepared by using the coating composition of the present invention, are also excellent in such properties as smoothness, water resistance, chemical resistance and durability, and these properties are hardly reduced under severe conditions in environments containing oxygen, ozone, rain water and gasses contained in air or under influences of heat and the like. Therefore, synthetic resin shaped articles can be advantageously utilized in the fields where high abrasion resistance and weatherability are required.

The present invention will now be described in detail with reference to the following Example that by no means limit the scope of the invention.

In these Examples, the properties of crosslinked coating films were determined and evaluated according to the following methods.

(1) Abrasion Resistance

Steel wool of #000 was attached to the top end of a cylinder having a diameter of 25 mm and brought into contact with the surface of a sample placed horizontally. The cylinder was rotated 5 turns at 20 rpm under a load of 0.3 Kg on the sample, and the degree of damaging of the sample surface was observed with the naked eye and the abrasion resistance was evaluated according to the following standard.
A: no substantial scratch on the sample surface
B: slight scratch on the sample surface
C: considerable scratch on the sample surface

(2) Adhesion

The cross-cut adhesive cellophane tape peel test was carried out. More specifically, eleven cuts reaching the substrate were formed on the crosslinked coating film at intervals of 1 mm in both the longitudinal and lateral directions, to form 100 square cuts each having an area of 1 mm². An adhesive cellophane tape was applied to the cut coating film and it was rapidly peeled. The adhesion was evaluated according to the following standard.
A: none of square cuts of the film peeled
B: 1 to 50 square cuts peeled
C: 51 to 100 square cuts peeled

(3) Surface smoothness

The surface smoothness was evaluated according to the following standard.
A: good surface smoothness of the coating
B: slight unevenness on the surface of the coating
C: considerable unevenness on the surface of the coating and poor smoothness

(4) Appearance

The appearance was evaluated according to the following standard.
(a) Discoloration or hazing:
A: neither discoloration (yellowing or whitening) nor hazing
B: slight discoloration or hazing
C: prominent discoloration or hazing
(b) Crack formation or film separation:
A: not observed
C: observed

(5) Weatherability

The weatherability test was carried out by using a sunshine carbon weather-ometer (Model WE-SUN-HC supplied by Toyo Rika) under conditions of a black panel temperature of 63°±3° C., a raining time of 120 minutes and a cycle period of 180 minutes.

EXAMPLES 1 THROUGH 5 AND COMPARATIVE EXAMPLES 1 THROUGH 8

A curable liquid composition shown in Table 1, below, was prepared and a polycarbonate resin sheet having a thickness of 2 mm (trade name "Upilon", supplied by Mitsubishi Gas Kagaku) was dipped in the composition and pulled up from the composition to form a coating thereon. The coated sheet was allowed to stand for 3 minutes and both the surface of the coated sheet were irradiated in air two times with ultraviolet rays for 10 seconds by using high pressure mercury lamps (ozone type) of 2 KW located at the positions apart by 20 cm from the surface of the coating, respectively. The obtained results are shown in Table I, below.

Abbreviations used in Table I indicate the following substances.

TABLE I

| | | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Ex. 4 | Ex. 5 |
|---|---|---|---|---|---|---|---|---|---|---|---|---|---|---|
| Coating Composition (parts by weight) | | | | | | | | | | | | | | |
| Monomers | 2P5A | 65 | 65 | 65 | 65 | 65 | 65 | 65 | 65 | 65 | 65 | 65 | 65 | 65 |
| | THF-A | 35 | 35 | 35 | 35 | 35 | 35 | 35 | 35 | 35 | 35 | 35 | 35 | 35 |
| Photosensitizer | Bip | 1.5 | 1.5 | 1.5 | 1.5 | 1.5 | 1.5 | 1.5 | 1.5 | 1.5 | 1.5 | 1.5 | 1.5 | 1.5 |
| Alkyl methacrylate or acrylate polymer | | MA2 | MA7 | MA10 | | MA7 | MA7 | MA7 | MA11 | MA12 | MA13 | MA14 | MA2 | MA10 |
| | | 3 | 3 | 3 | 0 | 3 | 0.2 | 10 | 3 | 3 | 3 | 3 | 3 | 3 |
| Silicone type surface active agent | | 0.3 | 0.3 | 0.3 | 0.3 | 0.3 | 0.3 | 0.3 | 0.3 | 0.3 | 0.3 | 0.3 | 0.3 | 0.3 |

TABLE I-continued

|  |  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Ex. 4 | Ex. 5 |
|---|---|---|---|---|---|---|---|---|---|---|---|---|---|---|
| Organic solvent | iso-PrOH | 160 | 160 | 160 | 160 | 160 | 160 | 160 | 160 | 160 | 160 | 160 | 160 | 160 |
|  | Toluene | 40 | 40 | 40 | 40 | 40 | 40 | 40 | 40 | 40 | 40 | 40 | 40 | 40 |
| Ultraviolet absorber | Y | 18 | 18 | 18 | 18 | 0 | 18 | 18 | 18 | 18 | 18 | 18 | 12 | 12 |
|  | Z | 0 | 0 | 0 | 0 | 0 | 0 | 0 | 0 | 0 | 0 | 0 | 6 | 6 |
| Initial Properties |  |  |  |  |  |  |  |  |  |  |  |  |  |  |
| Film thickness ($\mu$) |  | 4 | 4 | 4 | 4 | 4 | 4 | 4 | 4 | 4 | 4 | 4 | 4 | 4 |
| Abrasion resistance |  | A | A | A | A | A | A | B | A | A | A | B | A | A |
| Adhesion |  | A | A | A | A | A | A | B | A | A | A | A | A | A |
| Smoothness |  | A | A | A | B | A | A | C | B | B | A~B | C | A | A |
| Appearance (a) |  | A | A | A | C | A | C | B | C | C | A~C | C | A | A |
| Weatherability test (accelerated sunshine exposure) |  |  |  |  |  |  |  |  |  |  |  |  |  |  |
| 500 hours | Appearance (a) | A | A | A | — | C | — | — | — | — | — | — | A | A |
|  | (b) | A | A | A | — | A | — | — | — | — | — | — | A | A |
|  | Adhesion | A | A | A | — | B | — | — | — | — | — | — | A | A |
| 1000 hours | Appearance (a) | A | A | A | — | C | — | — | — | — | — | — | A | A |
|  | (b) | A | A | A | — | C | — | — | — | — | — | — | A | A |
|  | Adhesion | A | A | A | — | C | — | — | — | — | — | — | A | A |
| 1500 hours | Appearance (a) | B | B | B | — | C | — | — | — | — | — | — | A | A |
|  | (b) | A C | A C | B C | — | C | — | — | — | — | — | — | A | A |
|  | Adhesion | B | B | B | — | — | — | — | — | — | — | — | A | A |

2P5A: dipentaerythritol pentaacrylate
THF-A: tetrahydrofurfuryl acrylate
Bip: benzoin isopropyl ether
Y: 2-hydroxy-4-n-octyloxybenzophenone
Z: 2,4-dihydroxybenzophenone
MA2: methyl methacrylate/butyl methacrylate copolymer (50/50 weight ratio, $[\eta] = 0.04$)
MA7: polyethyl methacrylate ($[\eta] = 0.09$)
MA10: poly-iso-butyl methacrylate ($[\eta] = 0.03$)
MA11: polystyrene ($[\eta] = 0.10$)
MA12: polydodecyl methacrylate ($[\eta] = 0.13$)
MA13: poly-iso-butyl methacrylate ($[\eta] = 0.002$)
MA14: poly-iso-butyl methacrylate ($[\eta] = 0.50$)
iso-PrOH: isopropyl alcohol

EXAMPLE 6 AND COMPARATIVE EXAMPLE 9 THROUGH 13

A polycarbonate resin sheet having a thickness of 3 mm was dipped in a curable liquid composition shown in Table II, below, and pulled out from the composition to form a coating thereon. Both the surfaces of the coated sheet were exposed in air to ultraviolet rays emitted from high pressure mercury lamps (ozone type) of 2 KW located at the positions apart by 20 cm from the surfaces of the sheet, respectively, for 15 seconds. The obtained results are shown in Table II, below.

TABLE II

|  | Example No. | Ex. 6 | Comp. Ex. 9 | Comp. Ex. 10 | Comp. Ex. 11 | Comp. Ex. 12 | Comp. Ex. 13 |
|---|---|---|---|---|---|---|---|
| Coating Composition (parts by weight) | Monomors 2P6A*1 | 30 | 10 | 30 | 30 | 30 | 30 |
|  | 2P5A | 30 | 10 | 30 | 30 | 30 | 30 |
|  | THF-A | 40 | 80 | 40 | 40 | 40 | 40 |
|  | Photo-sensitizer |  |  |  |  |  |  |
|  | BEE*2 | 1.5 | 1.5 | 1.5 | 1.5 | 1.5 | 1.5 |
|  | BNP*3 | 2.5 | 2.5 | 2.5 | 2.5 | 2.5 | 2.5 |
|  | Alkyl methacrylate or acrylate polymer, MA7 | 3.5 | 3.5 | 0 | 3.5 | 0 | 0 |
|  | Silicone type surface active agent | 0.2 | 0.2 | 0.2 | 0.2 | 0.2 | 0.2 |
|  | Organic solvent |  |  |  |  |  |  |
|  | iso-PrOH | 120 | 120 | 120 | 120 | 120 | 120 |
|  | Toluene | 30 | 30 | 30 | 30 | 30 | 30 |
|  | Ultraviolet Z | 6 | 6 | 0 | 0.3 | 0.3 | 6 |
|  | absorber Y | 12 | 12 | 0 | 0.7 | 0.7 | 12 |
|  | Film thickness ($\mu$) | 4.5 | 4.5 | 4.5 | 4.5 | 4.5 | 4.5 |
| Initial Properties | Abrasion resistance | A | B | A | A | A | A |
|  | Adhesion | A | A | A | A | A | A |
|  | Smoothness | A | A | A | A | A | B |
|  | Appearance(a) | A | A | A | A | A | C |
| Weatherability | 500 hours |  |  |  |  |  |  |
|  | Appearance (A) | A | A | C | C | C | — |
|  | (b) | A | A | C | A | B | — |
|  | Adhesion | A | A | C | A~B | C | — |
|  | 1000 hours |  |  |  |  |  |  |
|  | Appearance (A) | A | A | C | C | C | — |
|  | (b) | A | A | C | C | C | — |

TABLE II-continued

| Example No. | Ex. 6 | Comp. Ex. 9 | Comp. Ex. 10 | Comp. Ex. 11 | Comp. Ex. 12 | Comp. Ex. 13 |
|---|---|---|---|---|---|---|
| Adhesion 1500 hours | A | A | C | C | C | — |
| Appearance (A) | A | A | C | C | C | — |
| (b) | A | A | C | C | C | — |
| Adhesion | A | A | C | C | C | — |

NOTE
*¹2P6A, dipentaerythritol hexaacrylate
*²BEE, benzoin ethyl ether
*³BNP, benzophenone
Z 2,4-dihydroxybenzophenone

EXAMPLE 7

A polymethyl methacrylate sheet (trade name "ACRYLITE" supplied by Mitsubishi Rayon K.K.) having a thickness of 3 mm was dipped in a liquid coating composition comprising 25 parts by weight of dipentaerythritol hexaacrylate, 20 parts by weight of dipentaerythritol pentaacrylate, 10 parts by weight of dipentaerythritol tetraacrylate, 5 parts by weight of 2,2-bis(4-acryloxydiethoxyphenyl)propane, 35 parts by weight tetrahydrofurfuryl acrylate, 5 parts by weight of 2-hydroxyethyl acrylate, 100 parts by weight of isobutyl alcohol, 100 parts by weight of toluene, 2 parts by weight of benzoin isobutyl ether, 4.0 parts by weight of polyethyl methacrylate (MA7), 0.2 part by weight of a silicone type surface active agent, 16 parts by weight of 2-hydroxy-4-n-octyloxybenzophenone and 8 parts by weight of 2,4-dihydroxybenzophenone, and the sheet was pulled out from the composition to form a coating thereon. The sheet was allowed to stand still for 3 minutes, and both the surfaces of the coated sheet were irradiated 2 times with ultraviolet rays emitted from high pressure mercury lamps (ozone type) of 2 KW located at the positions apart by 20 cm from the surfaces of the coated sheet, respectively, for 13 seconds. The abrasion resistance, appearance and adhesion of the obtained product were good, and also the appearance and adhesion after 1,500 hours' weatherability test were good.

EXAMPLE 8

A coating composition comprising 25 parts by weight of dipentaerythritol hexaacrylate, 25 parts by weight of dipentaerythritol pentaacrylate, 10 parts by weight of dipentaerythritol tetraacrylate, 10 parts by weight ethylcarbitol acrylate, 30 parts by weight of tetrahydrofurfuryl acrylate, 0.4 part by weight of a silicone type surface active agent, 2 parts by weight of benzoin ethyl ether, 2 parts by weight of benzophenone, 4 parts by weight of poly-n-butyl methacrylate ([η]=0.07), 12 parts by weight of 2-hydroxy-4-n-octyloxybenzophenone and 6 parts by weight of 2,4-dihydroxybenzophenone was coated on a polycarbonate injection molded sheet having a thickness of 3 mm by a bar coater to form a coating having a thickness of 5 microns thereon.

In the same manner as described in Example 7, both the surfaces of the coated sheets were irradiated two times with ultraviolet rays emitted from the same high pressure mercury lamps as used in Example 7, which were located at positions 20 cm apart from the surfaces of the coated sheet, respectively, for 13 seconds.

The abrasion resistance, appearance and adhesion of the obtained product were good, and also the appearance and adhesion after 1,500 hours' weatherability test were good.

We claim:

1. A coating composition which comprises:
(a) a polyfunctional monomer composition comprising (i) 40% to 100% by weight of a polyfunctional monomer containing at least three methacryloyloxy or acryloyloxy groups in the molecule and having a molecular weight of not higher than approximately 900 and (ii) 0% to 60% by weight of a monofunctional or bifunctional monomer having one or two methacryloyloxy or acryloyloxy groups in the molecule and having a molecular weight of not higher than approximately 300 per methacryloyloxy or acryloyloxy groups;
(b) 5 to 35 parts by weight, based on 100 parts by weight of the polyfunctional monomer composition (a) mentioned above; of at least one ultraviolet absorber,
(c) 0.5 to 8 parts by weight, based on 100 parts by weight of the polyfunctional monomer composition (a) mentioned above, of at least one polymeric material selected from polymers of alkyl methacrylates and alkyl acrylates; and
(d) 0.01 to 6 Parts by weight, based on 100 parts by weight of the polyfunctional monomer composition (a) mentioned above, of a photosensitizer.

2. A coating composition as set forth in claim 1, wherein the polyfunctional monomer composition comprises:
(i) 40% to 100% by weight of at least one polypentaerythritol polyacrylate containing at least three acryloyloxy groups in the molecule and having a molecular weight of not higher than approximately 900, said polypentaerythritol polyacrylate being represented by the following general formula (I):

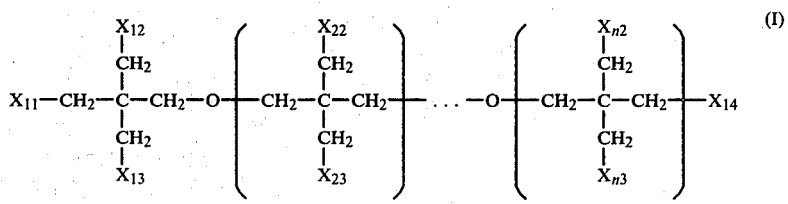

wherein at least three of $X_{11}$, $X_{12}$, $X_{13}$, $X_{22}$, $X_{23}$ ... $X_{n2}$, $X_{n3}$ and $X_{14}$ are acryloyloxy groups (CH₂=CH—COO—) and the remaining groups are hydroxyl groups (—OH), and n is an integer of from 2 to 5, (ii) 0% to 50% by weight of a bifunctional monomer represented by the following general formula (II):

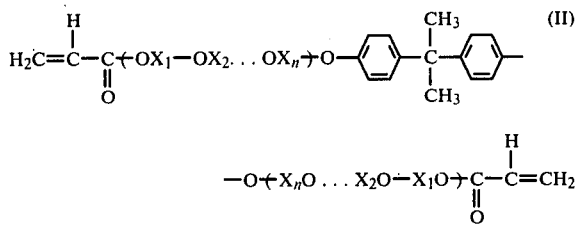

$$H_2C=\overset{H}{\underset{\underset{O}{\|}}{C}}-C{+}OX_1-OX_2\ldots OX_n{+}O-\text{\textlangle}\text{\textrangle}-\underset{CH_3}{\overset{CH_3}{C}}-\text{\textlangle}\text{\textrangle}- \quad (II)$$

$$-O{+}X_nO\ldots X_2O-X_1O{+}\underset{\underset{O}{\|}}{C}-\overset{H}{C}=CH_2$$

wherein $X_1, X_2 \ldots X_n$ may be the same or different and each stands for an alkylene group having up to 6 carbon atoms which group may have one hydroxyl substituent, and n is an integer of from 0 to 5, said bifunctional monomer having a molecular weight of not higher than approximately 300 per acryloyloxy group, and (iii) 0% to 60% by weight of a monofunctional monomer containing one acryloyloxy group in the molecule and having a boiling point of at least 150° C. at normal pressure, a viscosity of not higher than 20 cps as measured at 20° C. and a molecular weight of not higher than approximately 300.

3. A coating composition as set forth in claim 1 or 2, wherein at least one silicone type surface active agent modified with a polyoxyalkylene group is contained in an amount of 0.0001 to 2.0 parts by weight based on 100 parts by weight of the polyfunctional monomer composition.

4. A coating composition as set forth in claim 2, wherein the monomer represented by the general formula (I) is dipentaerythritol triacrylate, dipentaerythritol tetraacrylate, dipentaerythritol pentaacrylate or dipentaerythritol hexaacrylate.

5. A coating composition as set forth in claim 2, wherein the monofunctional monomer containing one acryoyloxy group in the molecule contains a hydroxyl group and/or an ether linkage on the side chain in the molecule.

6. A coating composition as set forth in claim 1 or 2, wherein the polymer of the alkyl methacrylate or alkyl acrylate is a homopolymer or copolymer of a monomer selected from alkyl methacrylates and alkyl acrylates, said alkyl group having 1 to 8 carbon atoms, and said polymer has an intrinsic viscosity [η] of from 0.01 to 0.30.

7. A coating composition as set forth in claim 1 or 2, wherein the ultraviolet absorber is a compound derived from benzophenone, benzotriazole, phenyl salicylate or phenyl benzoate and the maximum absorption wave length of said compound is in the range of from 240 to 380 nm.

8. A coating composition as set forth in claim 1 or 2, wherein the ultraviolet absorber is a compound represented by the following general formula:

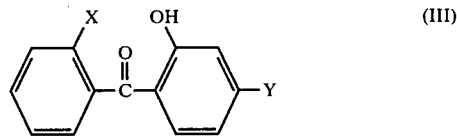

(III)

wherein X stands for —H or —OH and Y stand for —OH or —OR in which R stands for an alkylene group having 1 to 20 carbon atoms.

9. A coating composition as set forth in claim 8, wherein the ultraviolet absorber is a combination of 2-hydroxy-4-octyloxybenzophenone and 2,4-dihydroxybenzyophenone.

10. A process for the preparation of synthetic resin shaped articles excellent in the abrasion resistance and weatherability, which comprises coating the surface of a synthetic resin shaped article with a coating composition, and irradiating the coated shaped article with ultraviolet rays to form on the surface of the synthetic resin shaped article a crosslinked and cured film having a thickness of 1 to 30 microns, wherein said coating composition comprises:

(a) a polyfunctional monomer composition comprising
  (i) 40% to 100% by weight of a polyfunctional monomer containing at least three methacryloyloxy or acryloyloxy groups in the molecule and having a molecular weight of not higher than approximately 900 and (ii) 0% to 60% by weight of a monofunctional or bifunctional monomer having one or two methacryloyloxy or acryloyloxy groups in the molecule and having a molecular weight of not higher than approximately 300 per methacryloyloxy or acryloyloxy groups, (b) 5 to 35 parts by weight, based on 100 parts by weight of the polyfunctional monomer composition (a) mentioned above, of at least one ultraviolet absorber, (c) 0.5 to 8 parts by weight, based on 100 parts by weight of the polyfunctional monomer composition (a) mentioned above, of at least one polymeric material selected from polymers of alkyl methacrylates and alkyl acrylates, and (d) 0.01 to 6 parts by weight, based on 100 parts by weight of the polyfunctional monomer composition (a) mentioned above, of a photosensitizer.

11. A process for the preparation of synthetic resin shaped articles according to claim 10, wherein the polyfunctional monomer composition comprises:

(i) 40% to 100% by weight of at least one polypentaerythritol polyacrylate containing at least three acryloyloxy groups in the molecule and having a molecular weight of not higher than approximately 900, said polypentaerythritol polyacrylate being represented by the following general formula (I):

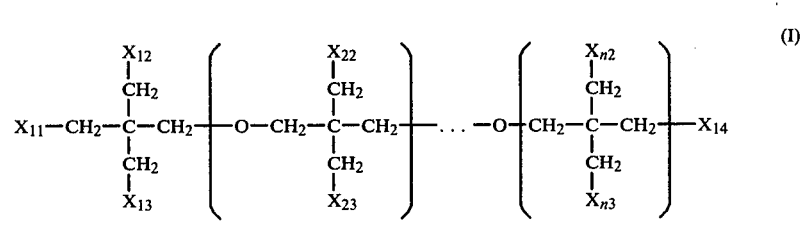

(I)

wherein at least three of $X_{11}$, $X_{12}$, $X_{13}$, $X_{22}$, $X_{23}$ ... $X_{n2}$, $X_{n3}$ and $X_{14}$ are acryloyloxy groups ($CH_2=CH-COO-$) and the remaining groups are hydroxyl groups (—OH), and n is an integer of from 2 to 5, (ii) 0% to 50% by weight of a bifunctional monomer represented by the following general formula (II):

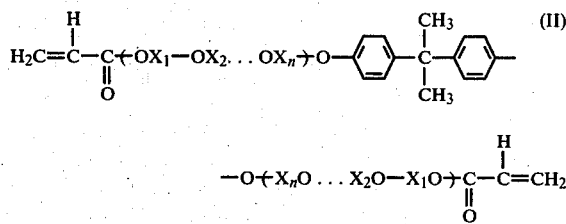

wherein $X_1$, $X_2$ ... $X_n$ may be the same or different and each stands for an alkylene group having up to 6 carbon atoms which group may have one hydroxyl substituent, and n is an integer of from 0 to 5, said bifunctional monomer having a molecular weight of not higher than approximately 300 per acryloyloxy group, and (iii) 0% to 60% by weight of a monofunctional monomer containing one acryloyloxy group in the molecule and having a boiling point of at least 150° C. at normal pressure, a viscosity of not higher than 20 cps as measured at 20° C. and a molecular weight of not higher than approximately 300; and, said irradiaton of the coated shaped article with ultraviolet rays is carried out in air.

12. A process for the preparation of synthetic resin shaped articles according to claim 10 or 11, wherein at least one silicone type surface active agent modified with a polyoxyalkylene group is incorporated into said coating composition in an amount of 0.0001 to 2.0 parts by weight based on 100 parts by weight of the polyfunctional monomer composition.

13. A process for the preparation of synthetic resin shaped articles according to claim 11, wherein the monomer represented by the general formula (I) is dipentaerythritol triacrylate, dipentaerythritol tetraacrylate, dipentaerythritol pentaacrylate or dipentaerythritol hexaacrylate.

14. A process for the preparation of synthetic resin shaped articles according to claim 11, wherein the monofunctional monomer containing one acryloyloxy group in the molecule contains a hydroxyl group and/or an ether linkage on the side chain in the molecule.

15. A process for the preparation of synthetic resin shaped articles according to claim 10 or 11, wherein the polymer of the alkyl methacrylate or alkyl acrylate is a homopolymer or copolymer of a monomer selected from alkyl methacrylates and alkyl acrylates, said alkyl group having 1 to 8 carbon atoms, and said polymer has an intrinsic viscosity $[\eta]$ of from 0.01 to 0.30.

16. A process for the preparation of synthetic resin shaped articles according to claim 10 or 11, wherein the ultraviolet absorber is a compound derived from benzophenone, benzotriazole, phenyl salicylate or phenyl benzoate, and the maximum absorption wave length of said compound is in the range of from 240 to 380 nm.

17. A process for the preparation of synthetic resin shaped articles according to claim 10 or 11, wherein the ultraviolet absorber is a compound represented by the following general formula:

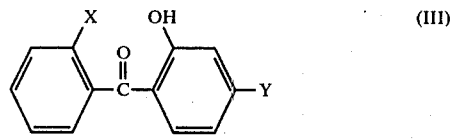

wherein X stands for —H or —OH and Y stands for —OH or —OR in which R stands for an alkylene group having 1 to 20 carbon atoms.

18. A process for the preparation of synthetic resin shaped articles according to claim 17, wherein the ultraviolet absorber is a combination of 2-hydroxy-4-octyloxybenzophenone and 2,4-dihydroxybenzophenone.

19. A coating composition, which comprises:
(a) a polyfunctional monomer composition comprising (i) from 40% to 100% by wt of a polyfunctional monomer of the formula:

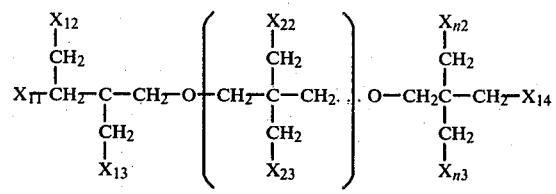

wherein at least three of $X_{11}$, $X_{12}$, $X_{13}$, $X_{22}$, $X_{23}$ ... $X_{n2}$, $X_{n3}$ and $X_{14}$ are acryloyloxy groups and the remaining groups are hydroxyl groups, and n is an integer of from 2 to 5 and wherein said polyfunctional monomer has a molecular weight of not greater than approximately 900 and (ii) from 0% to 50% by wt of a bifunctional monomer of the formula:

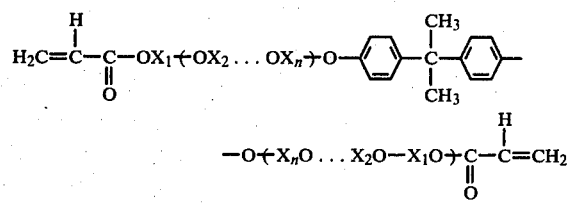

wherein $X_1$, $X_2$ ... $X_n$ may be the same or different and each represents an alkylene groups having up to 6 carbon atoms which groups may have one hydroxyl substituent, and n is an integer of from 0 to 5, said bifunctional monomer having a molecular weight of not higher than about 300 per acryloyloxy group;
(b) 5 to 35 parts by wt, based on 100 parts by wt of the polyfunctional monomer composition (a) mentioned above, of at least one ultraviolet absorber;
(c) 0.5 to 8 parts by wt, based on 100 parts by wt of the polyfunctional monomer composition (a) mentioned above, of at least one polymeric material selected from polymers of alkyl methacrylates and alkyl acrylates; and
(d) 0.01 to 6 parts by wt, based on 100 parts by wt of the polyfunctional monomer composition (a) mentioned above, of a photosensitizer.

* * * * *